United States Patent [19]
Pache

[11] Patent Number: 5,463,383
[45] Date of Patent: Oct. 31, 1995

[54] RECEIVER FOR LOCAL CALLS WITH LOW ENERGY CONSUMPTION

[75] Inventor: Rémy Pache, St-Sulpice, Switzerland

[73] Assignee: Eta SA Fabriques d'Ebauches, Grenchen, Switzerland

[21] Appl. No.: 62,255

[22] Filed: May 17, 1993

[30] Foreign Application Priority Data

May 27, 1992 [CH] Switzerland ............... 01718/92

[51] Int. Cl.[6] ................................................. G08B 5/22
[52] U.S. Cl. .............................. 340/825.44; 340/825.21; 370/105.4; 375/368
[58] Field of Search ................ 340/825.2, 825.21, 340/825.44; 455/343; 370/105.4, 106; 375/114, 116

[56] References Cited

U.S. PATENT DOCUMENTS

| | | | |
|---|---|---|---|
| 4,768,032 | 8/1988 | Sharpe et al. | 340/825.47 |
| 4,837,854 | 6/1989 | Oyagi et al. | 340/825.44 |
| 4,857,915 | 8/1989 | Andros et al. | 340/825.44 |
| 4,996,526 | 2/1991 | DeLuca | 340/825.44 |
| 5,001,471 | 3/1991 | Snowden et al. | 340/825.21 |
| 5,049,875 | 9/1991 | DeLuca et al. | 340/825.44 |
| 5,144,296 | 9/1992 | DeLuca et al. | 340/825.44 |
| 5,252,963 | 10/1993 | Snowden et al. | 340/825.44 |
| 5,325,088 | 6/1994 | Willard et al. | 340/825.21 |

FOREIGN PATENT DOCUMENTS

| | | |
|---|---|---|
| 0413369 | 2/1991 | European Pat. Off. . |
| 9006566 | 6/1990 | WIPO . |
| 9006634 | 6/1990 | WIPO . |

*Primary Examiner*—Donald J. Yusko
*Assistant Examiner*—Gregg V. Miller
*Attorney, Agent, or Firm*—Griffin, Butler, Whisenhunt & Kurtossy

[57] ABSTRACT

A local call receiver or pager includes a circuit (3) for receiving and demodulating a call signal emitted by a central station and which contains synchronization code words, address code words and message code words. The circuit is connected to the pager energy source (16) through a switching circuit (3b) for cutting off the energy supply when it is not necessary to receive the call signal. The pager also includes a decoder (4) intended to control the switching circuit as a function of the analysis of the call signal synchronization code words. The analysis is effected bit-by-bit and the receiver circuit is disconnected as soon as the synchronization code word is recognized, in most cases following analysis of only a few bits of the code word. Application is in respect of pagers in which a satisfactory compromise must be obtained between dimensions and autonomy, as for instance in pagers combined with a timepiece to be worn on the wrist.

9 Claims, 9 Drawing Sheets

RECEIVER FOR LOCAL CALLS WITH LOW ENERGY CONSUMPTION

The present invention concerns local call systems and more specifically the energization of local call receivers used in such systems. In what follows in the present description, such local call receivers will be designated by the word "pager" since such term is now very largely admitted and used, as much by specialists as by the public which uses them.

The present invention may be used in portable pagers capable of receiving message signals broadcast at high frequency, the invention being described hereinafter in respect of this particular application to which however it is not limited.

BACKGROUND OF THE INVENTION

Telecommunication systems in general and local call systems more specifically, employing radio-broadcast message signals are presently largely employed to ensure the calling of pagers with the purpose of sending information selectively to them from a central station. Such information is transmitted by means of coding schemes and predetermined message formats such as those known under the acronyms POCSAG or GOLAY.

One of the major problems which is encountered in the development and commercialization of pagers concerns the energy supply thereto and more specifically its operational autonomy when the pager is portable, taking into consideration the energy storage capacity of the energy source incorporated into the pager.

For example, pagers presently exist on the market produced in the form of a timepiece which in addition to assuring the pager function is also given the possibilities of indicating the time of day and other timekeeping functions such as the indication of elapsed time, the date and the day of the week. In such arrangements, which are preferably worn as a wristwatch, the dimension of the energy source is naturally of very great importance. The smaller such dimension is, the more one can reduce the dimensions of the timepiece and, proceeding therefrom, obtain more facilities for conceiving a timepiece having an agreeable design, such condition being essential in order to render the timepiece saleable in mass quantities.

Up to the present, the manufacturers of known pagers have only very partially attained this objective of very small consumption. Consequently, they are accustomed to providing pagers with a rather voluminous energy source in order to attain a compromise between an acceptable autonomy and a size compatible with easy handling and daily transport by the user on his person. If a good compromise of this type is relatively easily attainable for a pager carried in a pocket of the clothing, for instance, it is by no means the same when it is necessary to house at the same time a pager, a timepiece and an energy source in a volume as small as that of a watch worn on the wrist. Pagers of this nature already on the market have certainly the required volume, even though their design often leaves something to be desired, but on the other hand they have a relatively feeble autonomy. Thus, there exist pager watches in which, in order to be able to house a battery of sufficient size, there is provided on the case a housing which lateraly overflows the perimeter covered by the dial or, more generally, the display arrangement. Such protuberance evidently spoils the design of the assembly in a manner that in such an embodiment, a good compromise between autonomy and volume (or design) is not attained.

Specialists in the domain of pagers know that the greatest consumer of energy in the pager is the receiver which, from the antenna, is charged with receiving the modulated carrier transmitted by the central station and demodulating such carrier in order to extract therefrom the useful binary signal. Various propositions have thus been made in the past in order to avoid operation of the receiver during the entire time that the user maintains the pager turned on or under energization.

Certain of these propositions foresee simply providing the pager with a time circuit capable of cutting the energization of the pager in an arbitrary manner, for example during the night when the user, having then no need of the pager, has forgotten to turn it off. This solution is not by itself satisfactory in order to attain a very small consumption.

Other more sophisticated solutions consist in rendering the cut-off periods of the pager a function of the form or type of received signal. Such a solution is described for instance in the patent U.S. Pat. No. 4,370,753 in the framework of radio-broadcast message signals including a preamble followed by a certain number of messages representing the information to be transmitted. In this case, a control circuit periodically connects the energy source to the receiver in order that a frequency detector may recognize in the received signal preamble a sequential code belonging to the pager under consideration and this according to a special form bringing on multiple recognition. Once the code has been recognized, the receiver is placed under tension during an extended period capable of covering the duration of several consecutive messages contained in the received signal. This solution effectively permits placing the receiver into operation only during reduced periods and one thus succeeds in economizing the energy consumed by the pager. However, the receiver remains supplied during long periods and does not take into account the fact that the radio-broadcast signal contains a great quantity of information which is not useful for one pager under consideration, but in fact is addressed to other pagers forming part of those to which the radio-broadcast signal is sent. Furthermore, under certain operating conditions, a pager has generally no need to process the entire contents of the information which reaches it, even if such is more specifically destined for it, for example in order to permit it to be synchronized with the rhythm of the transmitter of the radio-broadcast signal.

Another solution is described in patent EP 0 118 153. In this case it concerns a pager specifically intended to work with the POCSAG format. The circuit of this pager also permits cutting off the energization of the receiver under certain operating conditions as is permitted by the POGSAG format. More precisely, in supposing that the pager has already assured its synchronization with the bits of the received message signal and also with the groups of synchronization and message code words (addresses and message information) an energization control circuit authorizes energization of the receiver during the period of each synchronization code word and each signal frame which is allocated to such pager within a group of message code words. This circuit thus enables obtaining a better energy economy than the pager of the previously cited US patent.

However, the recognition of synchronization or address code words can only take place after reception of the totality of these words, for which procedure all the bits of such words must necessarily be checked in their totality and subjected to an error analysis. It results therefrom that such a pager still presents a relatively high energy consumption taking into account the fact that a group of code words in the POCSAG format is presented each second during the broadcast of a data packet by the central transmitter, this operation itself being repeated every one to two minutes.

The invention is based on the determination that the energization periods of a pager receiver can be still further reduced without spoiling either good synchronization or good analysis of the message information intended for the pager under consideration.

The purpose of the invention is to create a pager in which the receiver is energized only during the time which is strictly necessary in order to permit correct interpretation of the information intended therefor, that is to say, without changing the success call rate, such pager thus permitting obtention of a good compromise between its autonomy and its general dimensions.

The invention also has as purpose to create a pager which may be advantageously, although not exclusively, provided in the form of a wristwatch capable, in addition to offering the pager functions, to provide one or several horological functions such as indication of the time of day and the date for example.

SUMMARY OF THE INVENTION

The invention thus has as its object a pager intended for receiving radio-broadcast message signals made up from a synchronization code word repeated at regular intervals, address code words and message information code words, said message information comprising one or several messages, such pager comprising:

- a receiver for receiving and demodulating said coded signals,
- a decoder intended for decoding said coded message signals in order to distinguish among said synchronization, address and message information code words and, when it is apparent that said pager is being addressed, extracting the message information intended therefor,
- a memory arrangement connected to said decoder and intended to store said message information,
- means connected to said memory arrangement for processing said message information so as to render it intelligible,
- energization means for powering said pager,
- switching means connected between said receiver and said energization means in order to apply selectively to such receiver the supply voltage furnished by said energization means,
- means for storing said synchronization code word, and
- control means for controlling said switching means so as to apply said voltage to said receiver in order to enable reception of the synchronization code word and to effect a comparison between said stored synchronization code word and the synchronization code word of said message signal, said control means being arranged to cut off said voltage following recognition of the synchronization code word, characterized in that said control means comprises means for effecting said comparison bit-by-bit over at least a portion of the synchronization code word bits and for actuating said switching means in the sense of a cut-off of said receiver when the comparison indicates recognition of the synchronization code word through identity of a limited number only of the bits of such word.

Thanks to these characteristics, the pager receiver is energized only during minimum periods which are strictly necessary in order that effective and certain recognition of the synchronization code word may be effected. There results therefrom a minimum energy consumption of the pager and consequently a better autonomy of the pager than it has been possible to obtain with pagers according to prior art technology.

The invention also has as objective a pager of the type defined hereinabove and in which said control means also include means for storing an address code word characteristic of said pager and means for effecting a bit-by bit comparison over at least a portion of the bits of such stored address code word with the corresponding bits of the address code words contained in the incoming message signal and in order to actuate said switching means in a manner that they maintain energization of said receiver only if said address comparison indicates a number of bits inequalities less than a predetermined number.

Thanks to this additional characteristic of the invention an energy economy may also be obtained for the recognition of the address which, in the incoming message signal, indicates that a message intended for the pager under consideration is present, the receiver of such pager also operating during a minimum of time during the recognition procedure.

Other characteristics and advantages of the invention will appear in the course of the description to follow and given solely by way of example and drawn up in referring to the attached drawings.

DESCRIPTION OF THE PREFERRED EMBODIMENT

Figure 1:
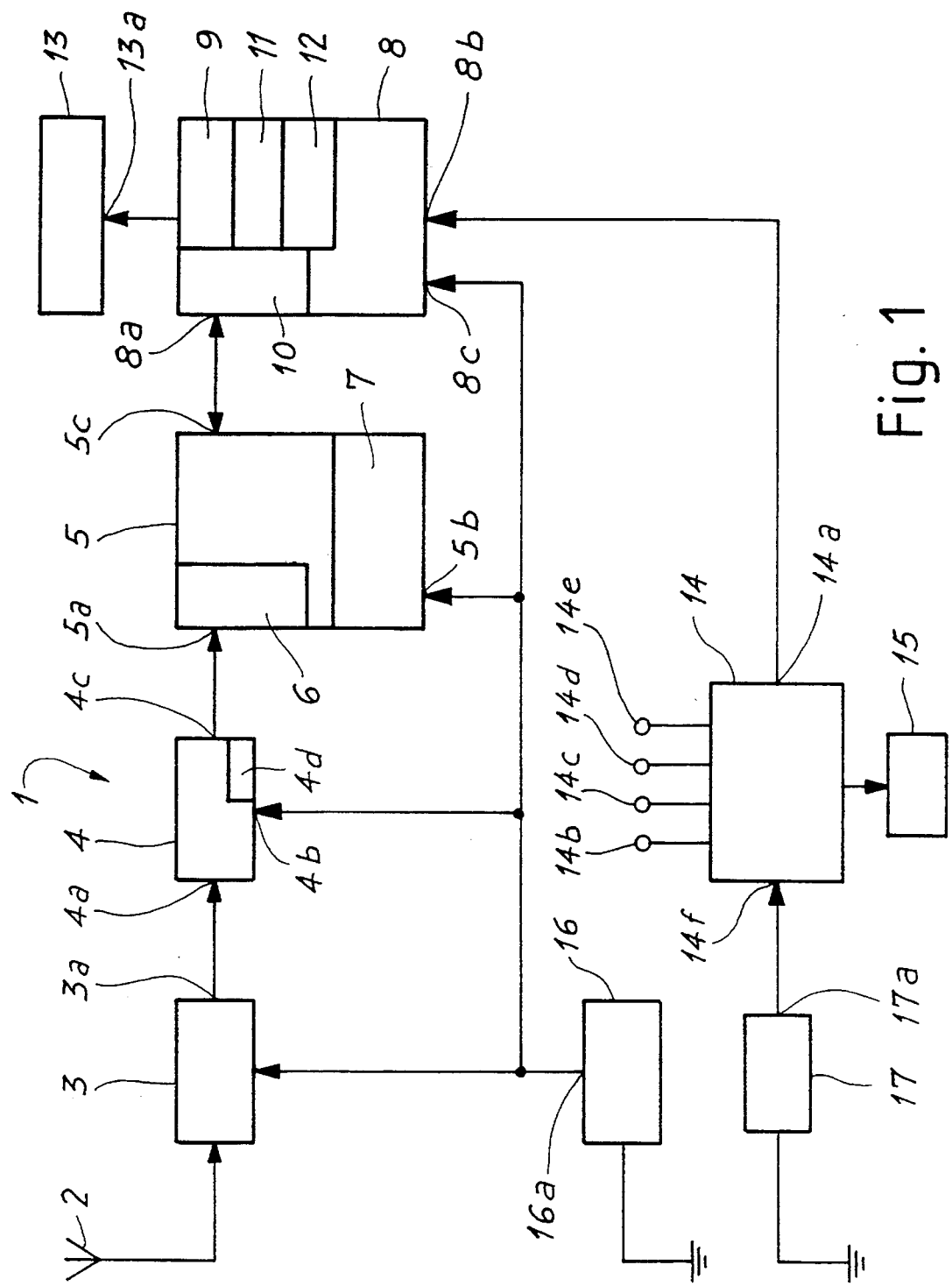
FIG. 1 is a simplified schematic of an embodiment of a pager according to the invention.

Referring now to FIG. 1 of the drawings, there is shown a simplified functional block diagram of pager 1 constructed in accordance with the present invention. The pager 1 comprises an antenna 2, and a receiver 3 connected to the antenna 2, for receiving transmitted coded message signals from a central station or other source from which it is desired to call the user of the pager 1. The transmitted coded message signals may contain selective call signalling information, identifying a particular one of several pagers of the type shown in FIG. 1, and chosen message information, and may be in the POCSAG or other suitable coding scheme format. The transmitted coded message signals detected at the antenna 2 are demodulated by the receiver 3 and a serial stream of binary data representing these coded message signals is provided at an output 3a of the receiver 3.

The pager 1 also comprises a decoder 4 connected to the output 3a of the receiver 3 at its input 4a. The decoder 4 contains a memory area 4d for storing certain predetermined address information to which the pager 1 will respond. The decoder 4 which will be described in detail hereinafter by reference to FIG. 4, comprises in particular a memory area 4d intended for storing predetermined address information to which the pager 1 under consideration will respond. It is adapted so that a comparison is made between the coded message signals received at its input 4a and the predetermined address information stored in the memory area 4d. If the selective call signalling information matches one of the stored addresses, the decoder provides the message information associated with the coded message signals at its output 4c.

The pager 1 further comprises a RAM memory device 5 connected to the output 4c of the decoder 4 at its input 5a. RAM memory device 5 includes a data processing unit 6 and a memory area 7. RAM memory device 5 is adapted to receive the selected message signals provided at its input 5a and store these message signals in the memory area 7. The data processing unit 6 is adapted to control the manner in which these message signals are stored in and retrieved from the memory area 7, and perform associated manipulations of the message signals, addresses, stack pointers and other internal variables. The detailed functioning of the memory device 5 is described in copending patent application Ser. No. 08/062,254, filed concurrently herewith and entitled "Receiver for Local Calls".

The pager 1 additionally comprises a microcomputer 8 connected to the output 5c of memory 5 at its input 8a. The microcomputer 8 includes in a known manner a display interface 9, a microprocessor 10, a randomaccess memory (RAM) area 11 and a read-only-memory (ROM) area 12. The display interface 9 is adapted to display chosen message information by driving a display 13 via an input 13a, and includes a serial driver circuit and serial multiplexed liquid crystal (LCD) driver circuits. The display 13 comprises an LCD display suitable for displaying the message information stored in the memory area 7 of RAM memory 5, and may also be adapted to display time or other information.

The ROM area 12 contains firmware for controlling the operation of the microprocessor 10, such as programs for the display of the indicia corresponding to the message information stored in the memory area 7, for controlling the input and output functions of the microcomputer 8, for providing command signals to memory 5 and the decoder 4, and for controlling the basic system timing of the microcomputer 8. The RAM area 11 is used for temporary data storage within the microcomputer 8, and amongst other functions provides a data buffer for message information provided from RAM memory 5 which is to be displayed.

The pager 1 further comprises an input control circuit 14 for providing data, at an output 14a to an input 8b of the microcomputer 8, indicative of input information provided by a user. User inputs 14b, c, d and e are connected to the input control circuit 14 and may be in the form of pushbuttons, rotatable buttons or other actuable members in order that a user can control some of the operations of the pager 1. The input control circuit 14 may also be adapted to control other devices associated with the pager 1. For example a timepiece may be combined with the pager 1 and the user inputs 14b, c, d and e may be used to provide user control of some of the functions of the timepiece. In addition, the input control circuit 14 may directly control the operation of some of the functions of the timepiece associated with the pager 1, such as providing current to energise the motor 15 of an electronic watch movement.

A portable power supply 16, which may be a battery, is also provided in the pager 1 for supplying power to the input 3b of the receiver 3, the input 4b of the decoder 4, the input 5b of RAM memory 5 and the input 8c of the microcomputer 8, from its output 16a. Another portable power supply 17 having an output 17a is provided to supply the input control circuit 14 with power at its input 14f. This arrangement advantageously supplies power from separate sources to the pager 1 and any associated devices, such as a timepiece, so that in the event that, for example, the battery supplying the pager becomes discharged, the timepiece may continue to function. It is to be appreciated however that both the pager 1 and any associated devices may be supplied from a single power source.

Figure 2A:
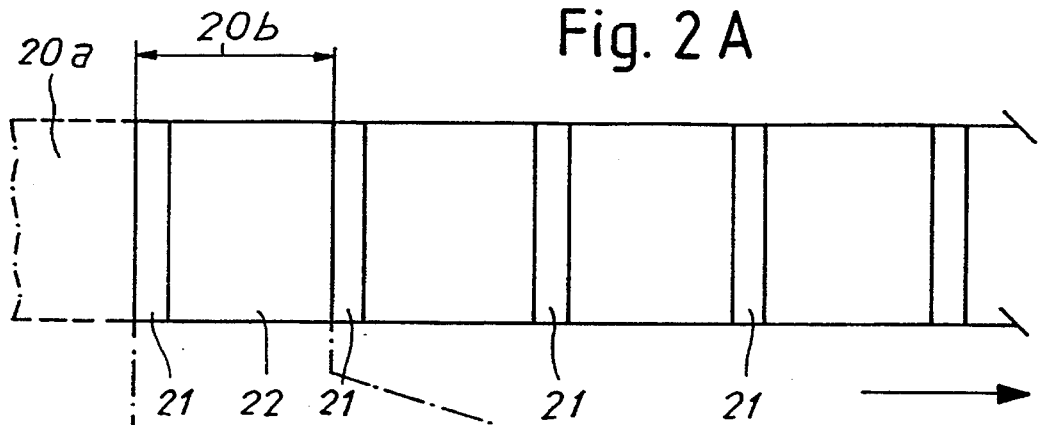
FIGS. 2A to 2C show a diagram representing the POCSAG coding scheme which can be used for transmission of message information intended for the pager of FIG. 1.
Figure 2B:
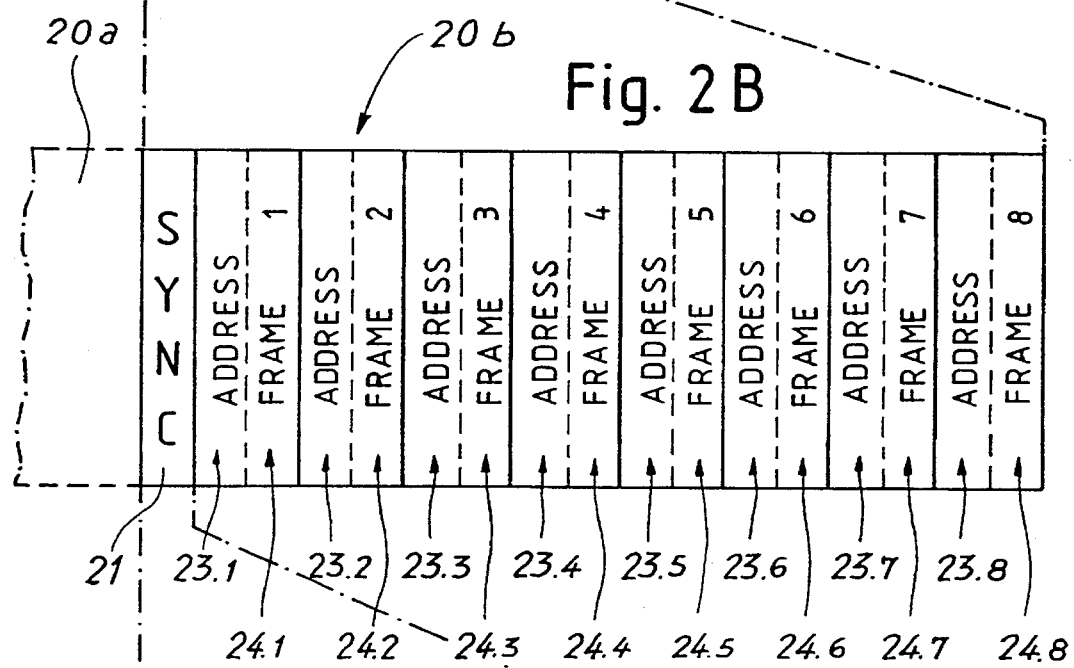
Figure 2C:
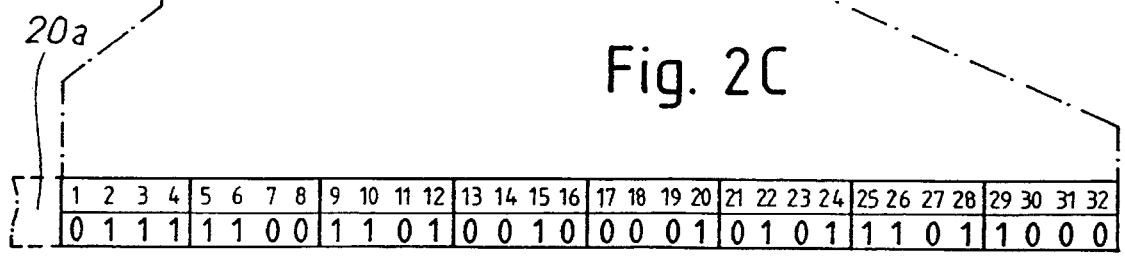

An example of the message information and pager coding scheme used for transmitting message signals such as those used by pager 1 are shown by FIGS. 2A to 2C. The system POCSAG, well known to specialists in the art, uses a digital coding format (FIG. 2A) made up from a preamble 20a and several groups of code words 20b, themselves each made up of a synchronization code word 21 and a group 22 of eight frames each of two code words, such groups of code words being transmitted in a serial format at regular intervals preceded by the preamble 20a. This latter includes a sequence of at least 576 bits alternatively made up from a "1" and a "0". The code words each have a length of 32 bits.

Each group 22 of eight frames is transmitted following a synchronization code word, the eight separate frames containing either address information or message information. For purposes of explanation, FIG. 2B shows that each frame includes an address-code word, 23.1 to 23.8 respectively, and a message code word 24.1 to 24.8 respectively, but this configuration has been chosen only by way of example since the code words containing message information can follow one another directly without interposition of an address code word if the message intended for the pager having this address code word is to receive a message extending over several frames.

Thus, in the example shown by FIG. 2B, each pager of a group formed of pagers in conformity with that shown on FIG. 1, must operate on one of the eight address-code words in a manner such that each of such words represents the call signalling information with the help of which each pager of the group is respectively identified. In the POCSAG format is allocated an address located always in the same frame of the group of code words.

FIG. 2C shows the composition of each synchronization code word, the contents being identical throughout the message signal established according to the POCSAG standard. Such synchronization code word includes 32 bits having the binary values indicated on FIG. 2C.

Figure 3:
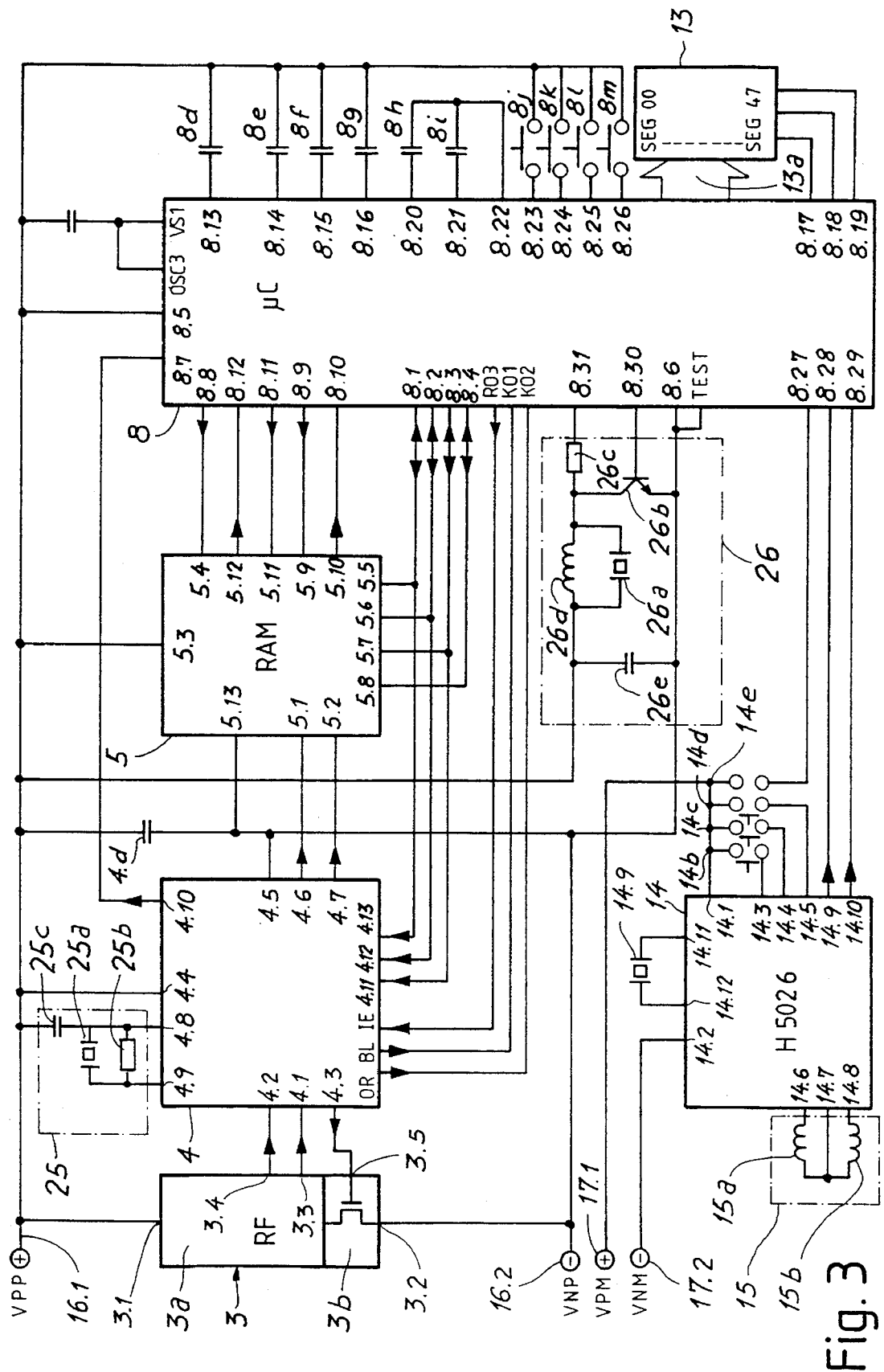
FIG. 3 is a more detailed schematic of the pager according to the invention.

The invention will be better understood in referring to FIG. 3 which shows a more detailed schematic of a preferred embodiment of pager 1 according to the invention. As already described hereinabove, pager 1 basically comprises an antenna (not shown on FIG. 3), receiver 3, decoder 4, RAM memory 5 and microcomputer 8. The circuit 14 for control inputs intended for controlling a timepiece 15 associated with the pager is also shown on FIG. 3.

Receiver 3 is connected by terminal 3.1 to a positive supply line 16.1 of the portable power supply 16 (not shown on FIG. 3), its negative terminal 3.2 being connected to a negative supply line 16.2 of the power supply 16. Receiver 3 includes a part 3a ensuring reception and demodulation of the message signal received on antenna 2, and a part 3b which constitutes selective switching means connected between terminal 3.2 and part 3a of the receiver. From this, energization of the reception and demodulation part may be selectively established or cut off, depending on the control signal applied to an input 3.5 of part 3b.

In a known manner, radio broadcast coded message signals are captured and demodulated by receiver 3 and the antenna to which the latter is connected so that groups of binary data such as those shown on FIG. 2A are generated at the output 3.3 of receiver 3 and transmitted to the input 4.1 of decoder 4. Receiver 3 includes in its internal circuitry an assembly (not shown on the figures but known per se) for checking the tension of the energy source 16, such assembly providing a signal indicating exhaustion of such source on output 3.4 of receiver 3. The output 3.4 transmits in such case the exhaustion indication signal to other circuits of pager 1 in order that a display readable by the user may be assured on the display 13.

Figure 4:
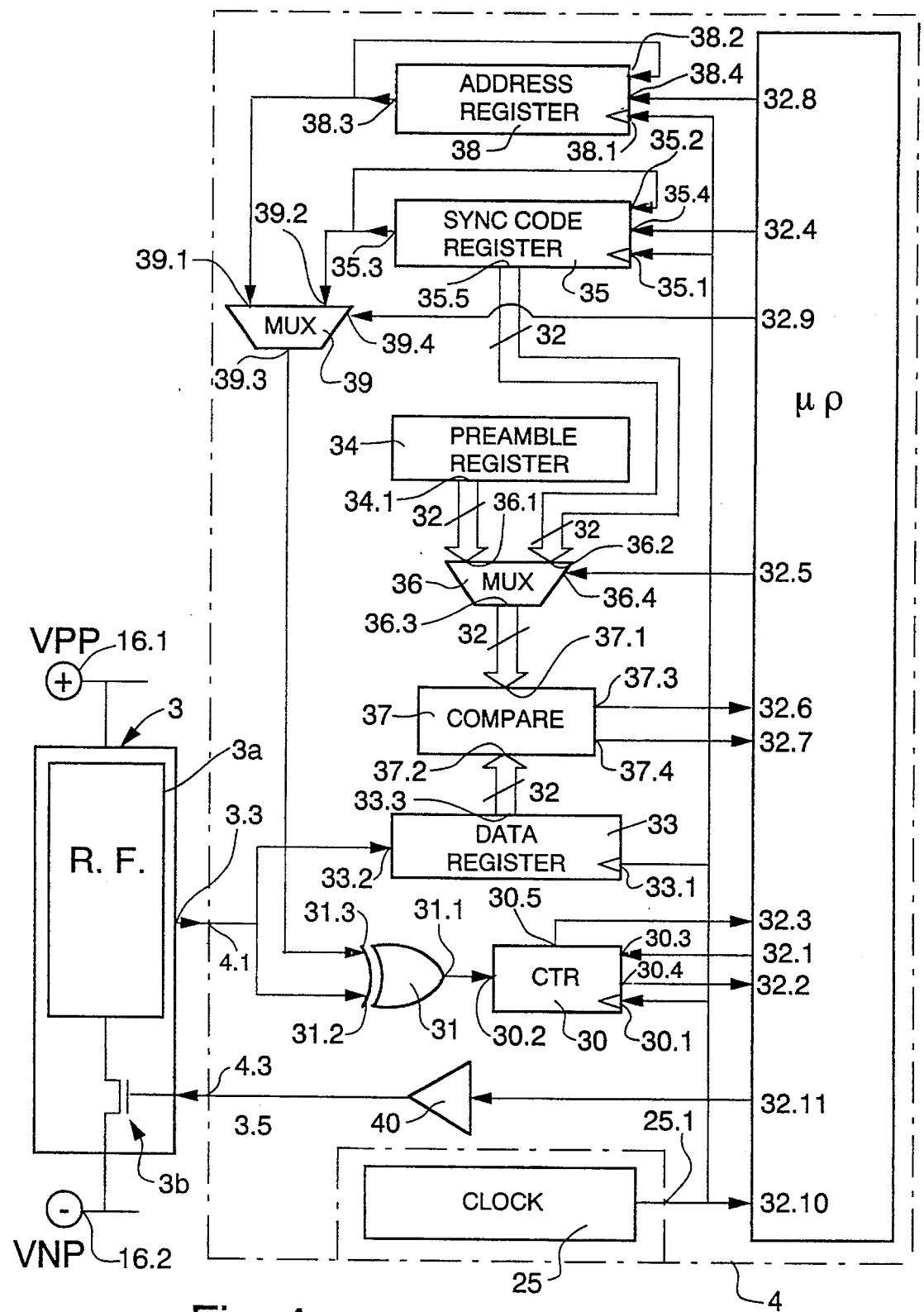
FIG. 4 is a simplified schematic of a decoder employed in the pager of FIG. 3, the figure illustrating more specifically how the principles of the invention may be put into practice.

Decoder 4 is connected to the positive supply line 16.1 by its terminal 4.4 and to the negative supply line 16.2 by its terminal 4.5. A voltage stabilization capacitor 4d is connected between terminals 4.4 and 4.5. The decoder will be described in detail hereinafter (FIG. 4). Its task is to separate the selective call signal information from the message information as such in the coded message signals and to compare the call signal information with the predetermined address information stored in the decoder and individual to the pager under consideration.

If the collective call signal information corresponds to one of the stored addresses, every message code word following the address code considered up to the following address code word is transmitted in the form of serial data from the output 4.6 to the input 5.1 of the RAM memory 5.

The output 4.7 from the decoder 4 furnishes a data transfer signal in order to permit reading by the RAM memory 5 of data available at the output 4.6, such signal assuming a high level or a low level at the input 5.2 of memory 5. The message information furnished to output 4.6 is introduced into the storage area 7 of the RAM memory 5 when a complete data byte has been transferred from receiver 3 to decoder 4.

A resonator circuit 25 is connected to the decoder 4 through inputs 4.8 and 4.9 of this latter. It comprises basically a quartz resonator 25a connected in parallel to a damping resistor 25b and to the inputs 4.8 and 4.9. The positive supply line 16.1 is connected to one of the quartz resonator terminals 25a through a resonance capacitor 25c. The resonator circuit 25 cooperates with the internal circuitry of decoder 4 in order to form an oscillator circuit which furnishes a periodic wave form of 32 kHz for example to decoder 4 in order to determine the rate of transmission of message signals from receiver 3 towards decoder 4. As is well understood, other clock frequencies may be used as a function of the transmission rate of message signals (38.4 kHz, 76.8 kHz etc.). Other clock frequencies are derived from this wave form by known circuits (not shown) to assure correspondance with the transmission rate of the message signals. The resonator circuit 25 is also used to furnish a clock signal to the microcomputer 8 and to the RAM memory 5. Such clock signal is furnished to the microcomputer 8 via the output 4.10 of decoder 4. The values of the resistor 25b and of the capacitor 25c may respectively be 4.7 MΩ and 10 pF.

Decoder 4 comprises a reprogrammable electrically erasable memory of the EEPROM type (not shown) in which are stored the system parameters of the decoder 4. Control signals can be sent from the microcomputer 8 towards the inputs 4.11, 4.12 and 4.13 in order to control the functions of the decoder 4. One of the functions of the decoder 4 which may be controlled is the rate of bit transmission between decoder 4 and the RAM memory 5, such rate going as high as 5000 bits/second. In such case, the message information is stored in the circular buffer located in the RAM memory 5 without undergoing any other processing (such as comparison between the last two messages which have just been stored).

The input 5.3 of RAM memory 5 is connected to the positive power supply line 16.1 while the input 5.13 is coupled to the negative line 16.2. The time base for memory 5 is determined by the clock signal furnished by output 8.8 of the microcomputer 8 to the input 5.4.

RAM memory 5 shows four terminals 5.5, 5.6, 5.7 and 5.8 respectively connected to corresponding terminals 8.1, 8.2, 8.3 and 8.4 of the microcomputer 8, which assures a simple parallel connection with this latter enabling the sending of control signals from the microcomputer 8 to memory 5 and the sending back of message information stored in memory area 7 of memory 5 towards the microcomputer 8 in order that such message information can be displayed. Depending on the nature of the control signal which is transmitted terminals 5.5 to 5.8 may also control RAM memory 5 in order to furnish the microcomputer 8 with status information in respect of the reception of message information by memory 5. Other control signals may control the latter in order that it manipulates message information which is stored therein as will subsequently appear herein. A data transfer input 5.11 for memory 5 is also provided in order to assure the simultaneous transfer of data towards terminals 5.5 to 5.8.

An input 5.9 determines whether inputs 5.5 to 5.8 carry data or introduce control signals into memory 5. When a high level signal is present on input 5.9, the signals on inputs 5.5 to 5.8 are interpreted as being control signals coming from the microcomputer 8, while if a low level signal is present, the signals are interpreted as constituting data.

A terminal 5.10 of memory 5 enables informing the microcomputer 8 that the memory is ready to receive control signals. A high level logic signal on terminal 5.10 is interpreted by the microcomputer 8 as indicating that memory 5 is ready for a further communication with the microcomputer 8 while a low level logic signal is interpreted as signifying that memory 5 is still in the process either of accomplishing a manipulation on the data or another operation, or is transferring data to the microcomputer 8.

An output terminal 5.12 from memory 5 serves to provide an interrupt signal to the microcomputer 8 in order to indicate thereto its functional status in response to the received message information or to the control signals. A high level logic signal is sent to the microcomputer 8 if, for example, fresh or repeated message information is received or if an unknown, forbidden or unperformable function is required by the microcomputer. Such interrupt signal may thus be used in order to indicate to microcomputer 8 that a new operation is required, such as for instance to announce the arrival of fresh message information or the sending of a new instruction to RAM memory 5. A low level signal indicates that no new action is required by the microcomputer 8.

Such microcomputer 8 may be of a known type suitably programmed. It is connected to the positive supply line 16.1 by its input 8.5 and to the negative supply line by its input 8.6. An input 8.7 receives the clock pulse train from the output 4.10 of decoder 4. An output terminal 8.8 furnishes a clock signal to the input 5.4 of RAM memory 5.

Microcomputer 8 also comprises output terminals 8.9 and 8.11 in order to furnish control signals and to transfer data as described hereinabove respectively to inputs 5.9 and 5.11 of memory 5, while input terminals 8.10 and 8.12 are provided in order to receive respectively the acceptance and interrupt signals from RAM memory 5 as described hereinabove.

A liquid crystal display 13 is connected to microcomputer 8. It comprises segments numbered from 00 to 47 which are connected to the display driver circuit (not shown on FIG. 3) of microcomputer 8 by a bus 13a such that each segment may individually be controlled and that the desired message information may be displayed by display 13. Persons skilled in the art will understand that various voltage values are necessary for the driver circuit in order to control the various segments of the display 13. Input terminals 8.13 to 8.16 are connected to the positive supply line 16.1 through capacitors 8d to 8g in order to provide these various voltages. Capacitors 8d to 8g may have respective values of 220, 100, 100 and 100 nF. Microcomputer 8 also comprises output terminals 8.17, 8.18 and 8.19 in order to furnish, in a known manner, control and time base signals to the display 13 coming from the driver circuit.

Input terminals 8.20, 8.21 and 8.22 are provided in order to stabilize and smoothe the internal voltage levels of the microcomputer 8. One of the terminals of a capacitor 8h is connected to input 8.20 while one of the terminals of another capacitor 8i is connected to input 8.21. The other terminals of capacitors 8h and 8i are connected together to terminal 8.22.

The microcomputer 8 is also provided with user control inputs 8.23 to 8.26, each one of which is connected to the positive supply line 16.1 through switches 8j, 8k, 8l and 8m which may be actuated by the user. When this occurs, a high level logic signal is applied to the control inputs by the user, for instance when he wishes to put the pager 1 into or out of operation, render it silent, protect the message displayed by display 13 and delete a displayed message. It will be understood that various other user control functions may be provided in this manner and that a separate input is not necessary for each of such functions thus provided; for example one or several switches or push-buttons can be actuated according to a special sequence in order to indicate to microcomputer 8 that a certain function is to be performed.

The circuit 14 for control inputs and the timepiece is connected to the positive supply line 17.1 from the portable energy source 17 (not shown on FIG. 3) by terminal 14.1 and to the negative supply line 17.2 from supply 17 by terminal 14.2.

Circuit 14 also comprises inputs 14.3. 14.4 and 14.5 which serve to form supplementary user inputs in order to enable the pager 1 to perform certain functions ordered by the user and also to control the operation of the timepiece 14 which is controlled by circuit 14. A special sequence of signals applied to inputs 14.3, 14.4 and 14.5 or signals initially sent to other inputs may be used in order to determine whether inputs 14.3, 14.4 and 14.5 control the operation of the pager or the timepiece 15. Inputs 14.3, 14.4 and 14.5 are respectively connected to one of the terminals of switches 14b, 14c and 14d, their other terminals being connected together at input 14.1. The switches may be provided under any form usable by the user. Another switch 14e is connected between the positive supply line 17.1 and an input 8.27 of the microcomputer 8 in order to indicate thereto whether it is the pager or the timepiece which is being controlled.

Circuit 14 further includes two outputs 14.6 and 14.8 respectively connected to one of the terminals of the two windings 15a and 15b of the timepiece 15. The other terminals of such windings are connected to a common return connection 14.7. Those skilled in the art will understand that in the example chosen herein windings 15a and 15b belong to a bidirectional motor of an analog quartz timepiece well known moreover, but that any other type of timepiece may be provided, including a digital timepiece in which case, as is well understood, a watch motor is not necessary. Various other inputs may be provided for circuit 14 in order to control any other function of the timepiece.

Two other outputs 14.9 and 14.10 of circuit 14 are respectively coupled to inputs 8.28 and 8.29 in order to furnish the microcomputer 8 with data representing the signals applied to inputs 14.3, 14.4 and 14.5. A quartz resonator 14.9 is coupled to input 14.11 and to output 14.12 of circuit 14 in order to constitute a time base for the latter.

Pager 1 also comprises a warning device 26 coupled to the microcomputer 8 in order that new message information received by decoder 4 may be announced. An electrical acoustic transducer 26a (buzzer) is connected by one of its terminals to the collector of a switching transistor 26b and by its other terminal to the positive supply line 16.1. The collector of transistor 26b is also connected to the output 8.31 of the microcomputer 8 through a polarization resistor 26c which may have a value of 18 kΩ. Normally, this output is maintained at a high logic level. The emitter of transistor 26b is connected to the negative supply line 16.2 and to terminal 8.6 of the microcomputer 8. The base of transistor 26b is connected to the output 8.30 of the latter. A choke 26d having an inductance of 45 mH, for instance, is connected in parallel with the buzzer 26a. Finally, a voltage stabilizing capacitor 26e having a value of 4.7 µF, is connected between the positive 16.1 and negative 16.2 supply lines. In normal operation, the output 8.30 is maintained at a low level and transistor 26b is non-conducting.

When pager 1 is to announce reception of a call or the accomplishment of another function, a signal which can have a variable wave form is transmitted by output 8.31 which generates a voltage at the terminals of the buzzer 26a which thus will produce a first sound. A different sound may be produced by transducer 26 when a signal is sent by the output 8.30 to the base of transistor 26b which then begins to conduct. A different voltage is then generated at the terminals of the buzzer 26a and a second sound is produced. Such different sounds can be used in order to announce performance of various functions by pager 1.

There will now be described in detail, in referring to FIG. 4, a part of decoder 4 more particularly charged with recognition of synchronization code words according to the concepts of this invention. On this figure there will be recognized resonator 25 which furnishes the clock signal at its output 25.1 which establishes the rhythms of the operations performed in particular in this part of decoder 4. The frequency of this clock signal is chosen as a function of that of the bits of the incoming message signal, namely 512, 1200 or 2400 Hz.

The decoder also comprises a synchronous counter 30 which exhibits an input 30.1 connected to the output 25.1 of the clock or resonator 25. Counter 30 includes a counting input 30.2 connected to the output 31.1 of an exclusive OR-gate 31, one of the inputs 31.2 of which is connected to input 4.1 of decoder 4. If input 30.2 is at a high logic level during the falling edge of the clock signal from output 25.1, then the value contained in counter 30 is incremented by one unit. If input 30.2 is at the low level, the preceding state of counter 30 is maintained. Counter 30 also comprises a reset-to-zero input 30.3 connected to the output 32.1 of a microprocessor 32 which controls the operations proceeding in this part of decoder 4 and which will be described in greater detail hereinafter.

Counter 30 also includes an output 30.4 connected to an input 32.2 of microprocessor 32 and which furnishes a "1" logic level when the contents of the counter are at zero. If not, this outputs 30.4 is at "0". Another output 30.5 of counter 30 is connected to an input 32.3 of microprocessor 32 and it applies a "1" logic level to the latter when the contents of counter 30 are less than or equal to 2 (0, 1 or 2). If not, this output furnishes a "0" logic level to microprocessor 32.

A 32-bit data register 33 is connected by a clock input 33.1 to the output 25.1 of clock 25 and by a loading input 33.2 to the output 3.3 of receiver 3. Thus, this register is serially loaded by receiver 33 at the rhythm of clock 25 with demodulated message signals in a manner such that the register always contains the last 32 bits received from the receiver. The 32 bits are available in parallel on an output 33.3 of the register.

The decoder also includes a 32-bit preamble register 34 which by its circuitry contains a sequence of bits alternatively "1" and "0" (1010 1010 1010 1010 1010 1010 1010 1010). The corresponding signal is available on an output 34.1 of this register. It corresponds to a part of the preamble of the POCSAG format.

A synchronization code word register 35 contains the synchronization code word in the POCSAG format, that is to say, that represented on FIG. 2B. This register is formed as a ring register and includes a clock input 35.1 connected to output 25.1 of clock 25. The register includes a most heavily weighted bit input 35.2 which is looped onto an output 35.3 for the lowest weighted bit. Thus, the bits of the synchronization code word contained in such register 35 are recirculated at the clock signal rate, a shift towards the left of the word occurring on each rising edge of such signal. Register 35 also comprises a reset to initial state input 35.4 connected to an output 32.4 of microprocessor 32. When such input 35.4 is brought to the "1" level, the synchronization code word recovers its initial or "centered" position in register 35. The instantaneous contents of register 35 are available over 32 bits on a parallel output 35.5.

A 32-bit multiplexer 36 includes a first input 36.1 connected to output 34.1 of register 34 and a second input 36.2 connected to output 35.5 of register 35. The output 36.3 of such multiplexer 36 is connected to a first input 37.1 of a comparator 37. Multiplexer 36 further comprises a control input 36.4 connected to an output 32.5 of microprocessor 32. When input 36.4 of multiplexer 36 is at the "1" level, the output 36.3 furnishes the binary word present at the input 36.2 of the multiplexer, if not the binary word present on input 36.1 appears at output 36.3.

Comparator 37 includes a second input 37.2 which is connected to output 33.3 of data register 33 as well as two outputs 37.3 and 37.4 connected to inputs 32.6 and 32.7 of microprocessor 32. Output 37.3 is at level "1" when there is equality between the binary words respectively applied to inputs 37.1 and 37.2. If not, this output is at the "0" level. The output 37.4 is at the "1" level when there is equality between the binary words or a difference between 1 or 2 bits of such binary words, if not this output 37.4 is at the "0" level.

Decoder 4 also comprises an address register 38 having 19 binary locations the most heavily weighted bit of which is at "0" and the 18 other bits of which are the 18 heavily weighted bits of the pager address under consideration. If the first bit of an information code word of the incoming message signal is at "0", this signifies that it concerns an address word. Register 38 is connected in the same manner as synchronization code word register 35. It includes thus a clock input 38.1 connected to output 25.1, a least weight input 38.2 connected to a heaviest weight terminal 38.3 and a reset-to-initial state input 38.4 which is connected to output 32.8 of microprocessor 32. Consequently, the contents of register 38 are recirculated on the rising edges of the clock signal in shifting towards the left. When input 38.4 is brought to the "1" level, the address code word in register 38 is recentered.

Terminal 38.3 of register 38 is connected to one of the inputs 39.1 of a one bit multiplexer 39, the other input 39.2 of which is coupled to terminal 35.3 of the synchronization code word register. The output 39.3 of multiplexer 39 is connected to input 31.3 of the exclusive OR-gate 31. Multiplexer 39 also includes a control input 39.4 which is coupled to an output 32.9 of microprocessor 32. If input 39.4 is at the "1" level, the output 39.3 of multiplexer 39 assumes the level of the input 39.2. In the opposite case, this output assumes the level of input 39.1.

Microprocessor 32 is intended to execute a simple microprogram capable of carrying the various control outputs 32.1, 32.5., 32.9, 32.4 and 32.8 to the desired logic level under the control of the clock signal which reaches it on input 32.10. Additionally, microprocessor 32 is capable of checking the state of its inputs 32.10, 32.2, 32.3, 32.7 and 32.6. The flow charts corresponding to this program are shown on FIGS. 5, 6A, 6B and 7.

The microprocessor thus develops an output signal on its output 32.11 which through a buffer 40 enables controlling the application of voltage to receiver 3 or the cut-off thereof relative to the energization which reaches it through conductors 16.1 and 16.2.

The invention is based on the following considerations.

With modern electronic components, it is possible to provide the pager with a clock 25 (quartz resonator) the precision of which is about 35 ppm at a constant temperature and taking into account manufacturing tolerances and ageing of the components.

Furthermore, it is known that the POCSAG format provides a repetition of the synchronization code word every 544 bits and that other transmission formats of pager message signals have a repetition frequency of their synchronization of the same order of magnitude.

Taking into account these two determinations, the invention exploits the fact that once synchronization has been obtained, it is extremely unlikely that the pager will lose such synchronization prior to receiving the following synchronization code word. Consequently, it is not necessary to check each time the totality of the synchronization code word as received, but on the contrary according to the proposal of this invention, to check only a portion thereof systematically bit by bit and to cut off receiver 3, the major energy consumer, during the reception of the rest of the synchronization code word, the cut-off period being directly beneficial for energy economy and thereby for the pager autonomy.

This procedure is put into operation in the assembly which has just been described with reference to FIG. 4 in a manner shown on FIGS. 5, 6A, 6B and 7.

Non-Synchronized State

It is supposed that the pager is not synchronized, that is to say, that since its putting into operation, it has not recognized the synchronization code word in the message signal broadcast by the central station, or that it has lost such synchronization, that is to say, that it no longer recognizes the word a certain number of times when it is in the receiving state.

Figure 5:
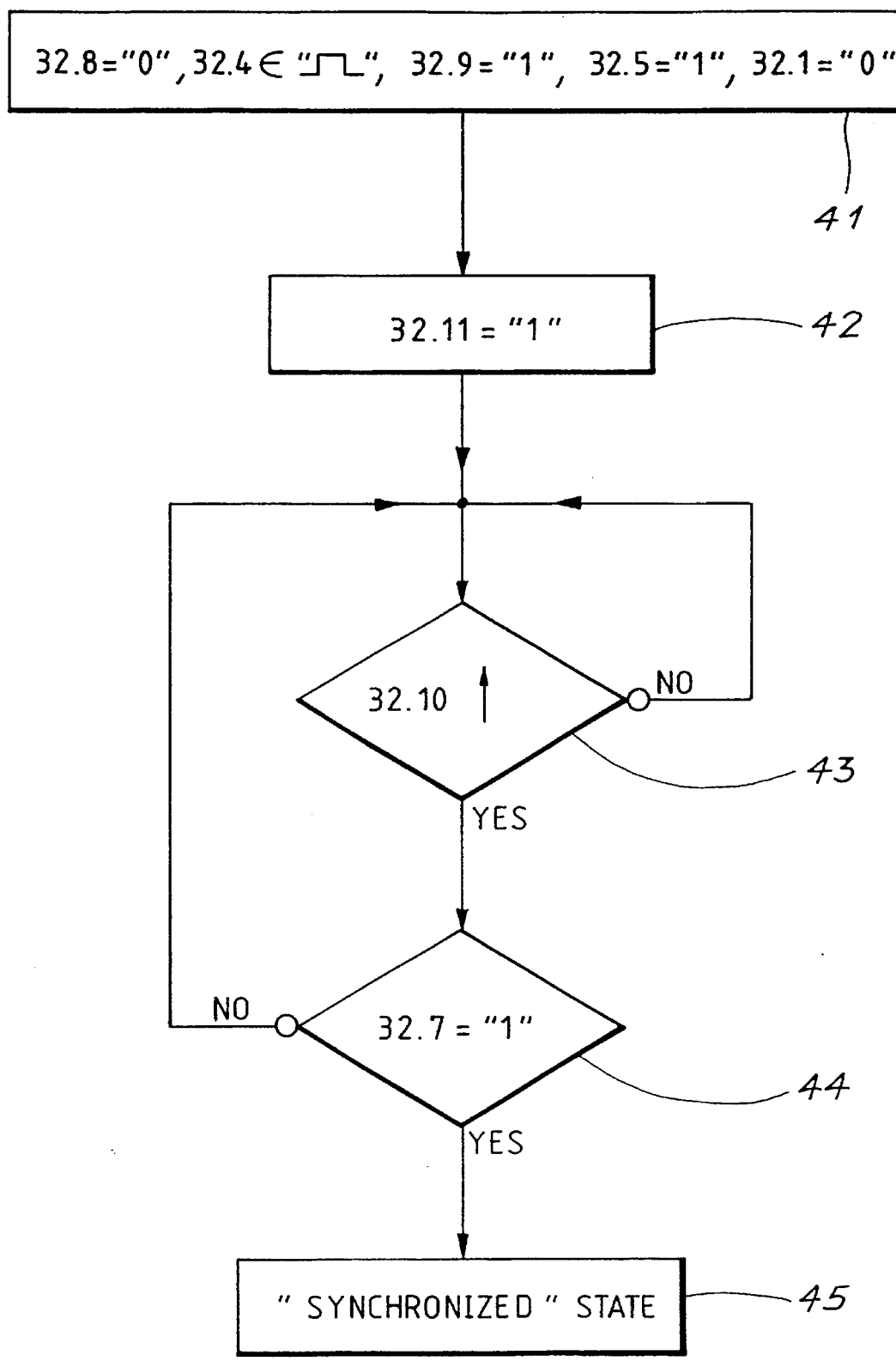
FIGS. 5, 6A, 6B and 7 are flow charts illustrating the recognition procedure of the synchronization code word in the pager according to the invention.

From this unsynchronized state, the microprocessor develops the signals depicted in block 41 of FIG. 5. In other words, output 32.8 is at "0", a pulse (passing to the "1" level and passing to the "0" level 13 microseconds later) is generated on output 32.4 and outputs 32.9, 32.5 and 32.1 are respectively at "1", "1" and "0". As is well understood output 32.11 is at "1" (block 42 of FIG. 5), since receiver 3 is energized in order to assure demodulation of the message signal.

It is to be noted that the length of the pulse generated on output 32.4 is equal to the length of a half period of the base clock signal which, in the example described here, is 32 kHz. For instance, if such base signal is 76.8 kHz, the length of the pulse will be 6.5 microseconds.

The synchronization code word is present in register 35 and is maintained centered therein by the signal appearing on input 35.4 of such register. Synchronization code words will be found periodically in the data register 33. During this time, the microprocessor 32 verifies on each rising edge of the clock signal whether the input signal 32.6 is at "1" (blocks 43 and 44 of FIG. 5). As soon as comparator 37 has recognized equality between registers 33 and 35, the microprocessor 32 detects such equality on its input 32.6 which then goes to "1". The pager is then declared synchronized (block 45) and may expect the address which is allocated to it in the frame of the subsequent data package, the receiver consequently being cut off or turned on by the microprocessor.

Synchronized State 512 bits later, the central station will broadcast a new synchronization code word. As already indicated hereinabove, neither this synchronization code word nor the following are checked in their totality if a loss of synchronization is not determined. The research performed by applicant has permitted to determine that it is sufficient to check only a very small number of bits of each received synchronization code word in order to maintain correct synchronization as long as the reception conditions do not change. It will be seen hereinafter how, according to the invention, one may succeed in this latter case in recovering synchronization.

In the embodiment described herein, only six bits of each incoming synchronization code word are checked by the assembly of FIG. 4, following running of the first placing into synchronization which has just been described with reference to FIG. 5. According to an advantageous characteristic of the invention and in the framework of the POC-SAG format, the bits which are checked are those which in the sequence of bits of the synchronization code word exhibit the greatest number of change-overs, this enabling the most effective checking. Such bits are those numbered from 19 to 24 (010101) on FIG. 2C. In principle, one could thus place the receiver 3 into operation only upon appearance of the 19th bit of each synchronization code word of the incoming message signal. However, receiver 3 needs a pre-turn-on time in order to permit it to become stabilized following application of the energization voltage. This time is advantageously chosen to be of a period of eight bits for a binary flow rate of 512 bits/second of message signal. In a general manner, the pre-turn-on time is chosen according to the following formula: ptt=1/D.E where ptt is the pre-turn-on time, D the binary flow rate of the message signal and E the number of pre-turn-on bits with 0<E <30.

This being the case, following determination of synchronization as described hereinabove, microprocessor 32 waits for 512 message signal bits through its internal elements (not shown on the figures), then according to block 46 of FIG. 6 loads a bit counter (forming part of such internal elements and also not shown) with the value (19 - E), while applying a pulse of 13 microseconds duration by output 32.4 to input 35.4 of register 35, which recenters the synchronization code word in such register.

Clock 25 (blocks 47, 48 and 49) then decrements the internal bit counter of microprocessor 32 down to the value 0, while the contents of register 35 recirculate at the rate of the clock signal. When the count has reached zero (block 50), microprocessor 32 delivers a signal on its output 32.11 to start the receiver 3, while value E is loaded into the internal bit counter. In conformity with blocks 51, 52 and 53, the counter is again cleared of its contents at the rate of the clock signal, while the synchronization code word continues to circulate in register 35. Simultaneously, the incoming bits and the synchronization code word bits are successively compared to one another in gate 31, the multiplexer 39, controlled to this effect by the output signal 32.9 on its input 39.4, switching such synchronization code word bits towards input 31.3 of such gate 31. However, counter 30 not as yet having been activated, such comparison will not yet produce an effect.

When the internal bit counter reaches zero, the nineteenth bit of the synchronization code word is located at the same time on both inputs of gate 31 under the condition, as may be well understood, that synchronization has been preserved. According to block 54, microprocessor 32 then furnishes the activation signal at its output 32.1 to counter 30 while simultaneously it loads the number "6" into its bit counter.

Figure 6A:
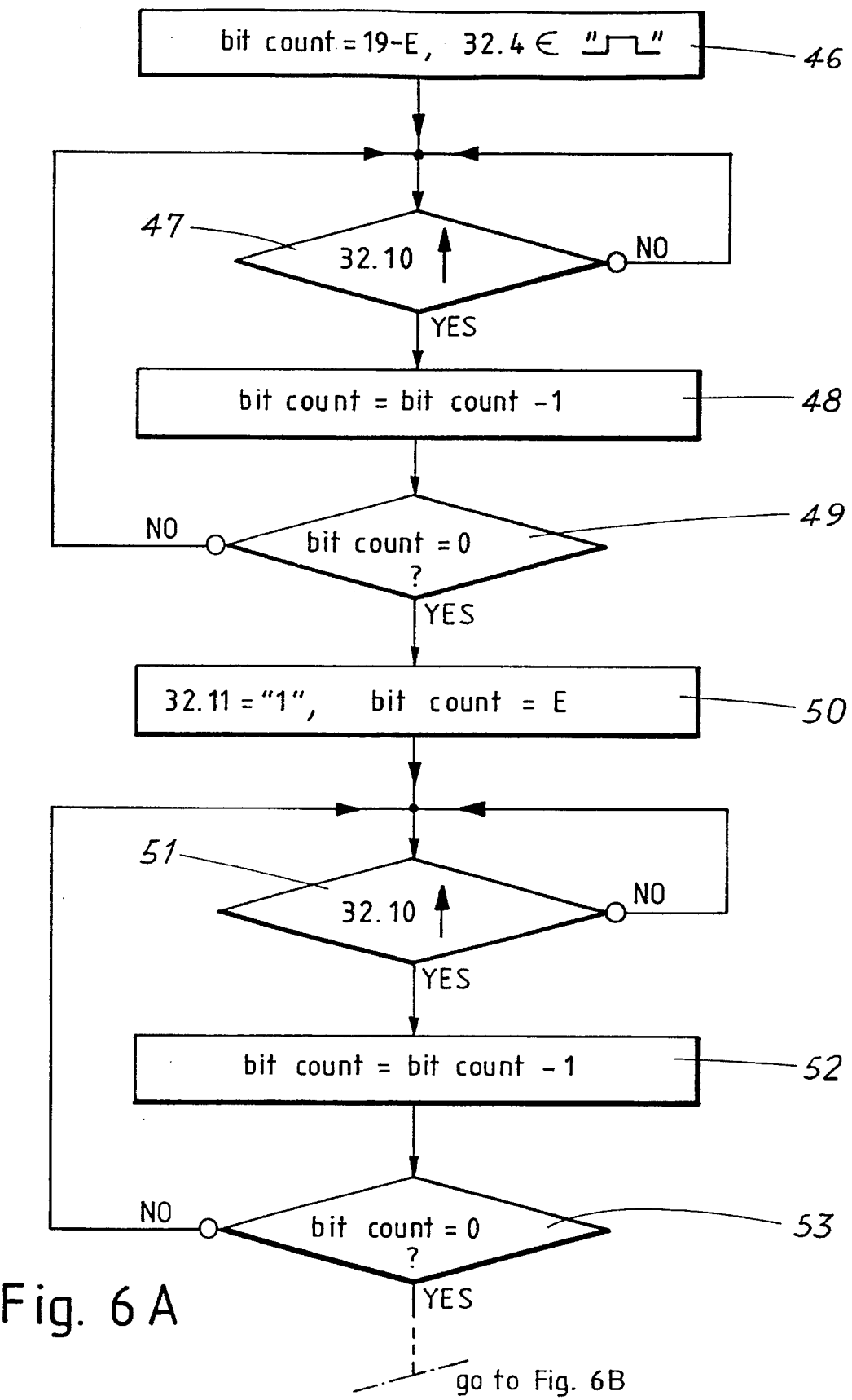
Figure 6B:
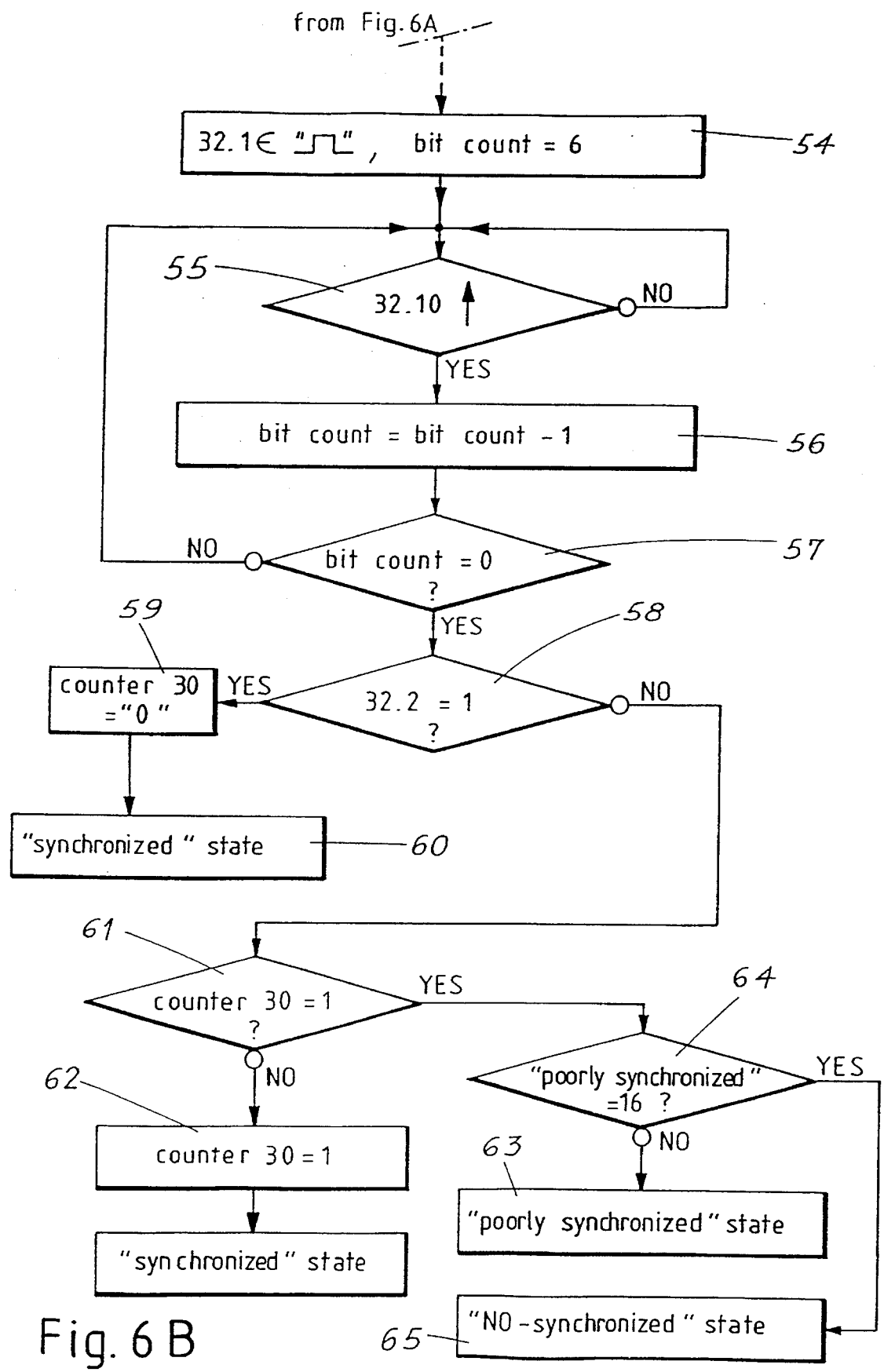

During the following six clock pulses (blocks 55, 56 and 57; FIG. 6B), the contents of the bit counter are decremented, the six bits (19 to 24) of the synchronization code word in register 35 are compared with the six incoming bits of the message signal and the microprocessor watches over the state of counter 30 through its input 32.2 (block 58, FIG. 6).

If the signal at the terminal 32.2 remains at "1" during the six following clock pulses, this signifies that the bits 19 to 24 of the synchronization code word correspond respectively one by one to the six incoming bits and that the pager thus remains synchronized (block 59).

If, on the other hand, the signal at terminal 32.2 goes to zero in the course of the six clock signals verifying the bits of the synchronization code word, this signifies that the comparison of one bit at the input 31.2 and 31.3 has not given a correct result. This result is stored in counter 30, but the pager remains in the synchronized state (block 60).

Upon reception of the following synchronization code word (512 bits later), the same procedure which has just been described is executed. If after comparison of the six bits, input 32.2 is at "1" (block 61), the pager remains in the synchronized mode (block 63) and eventual storing of an error resulting from the comparison during the preceding reception is cancelled by the reset-to-zero of counter 30 (block 61).

If, on the other hand, input 32.2 is once again at zero, the pager goes into a "poorly synchronized" state (block 63) which signifies that the next synchronization code word will be checked over 32 bits as described hereinbelow in respect of FIG. 7.

If the pager remains in the poorly synchronized state during 16 consecutive frames (block 64), it returns to the non-synchronized state (block 65) which corresponds to its initial state and microprocessor 32 then recommences the operations as described in respect of FIG. 5. In this state, the pager can no longer receive message information since the address search procedure is then interrupted.

Figure 7:
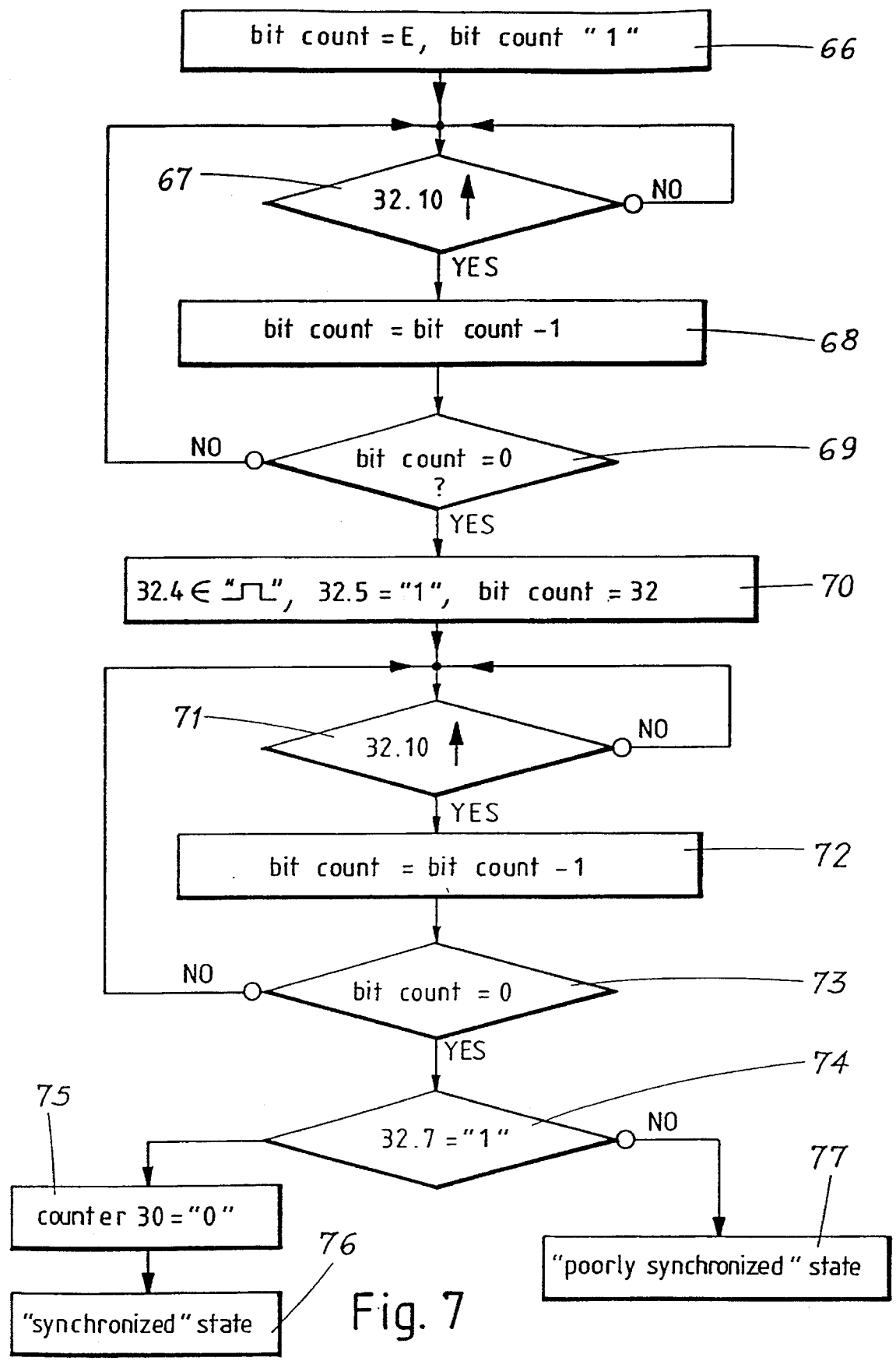

In the "poorly synchronized" state, number E is loaded in the internal bit counter of microprocessor 32, while signal 32.11 goes to "1" in order to restart receiver 3 (block 66, FIG. 7). After the count-down to zero of such counter (blocks 67, 68 and 69), the microprocessor applies a pulse to the input 35.4 of register 35, applies a "1" to input 36.4 of multiplexer 36 and loads its internal bit counter with the number 32 (block 70).

After count down of 32 clock pulses, microprocessor 32 checks the state of its input 32.7 in order to determine whether comparator 37 has found equality between the synchronization code word stored in register 35 and the incoming synchronization code word of the message signal (blocks 71, 72, 73 and 74).

If the microprocessor identifies a "1" on such input 32.7 (block 75), this signifies that the synchronization code word is again recognized and the pager goes into its "synchronized" state (block 71). If not, the pager remains in the "poorly synchronized" state (block 77) and again follows the flow chart of FIG. 7.

It is to be noted that when it is in the "synchronized" or "poorly synchronized" state, the pager tries to recognize its address in the bit package following each synchronization code word, and this in the frame of the package which is allocated to it.

Consequently, if such frame follows the synchronization code word immediately in time, the receiver is not cut off as to its energization.

Figure 8:
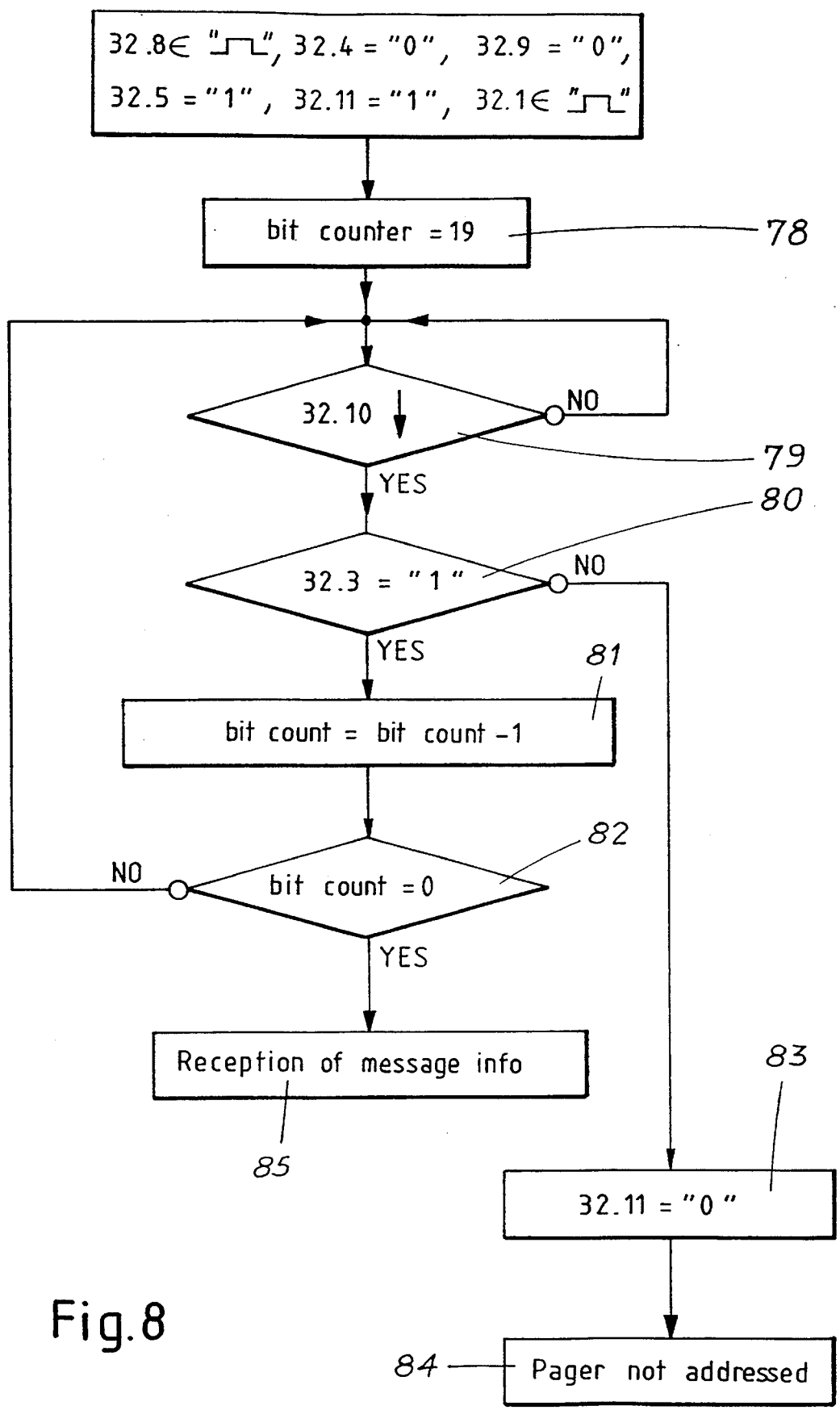
FIG. 8 is a flow chart illustrating the recognition procedure of the address code word in the pager according to the invention.

There will now be described the process of address code word recognition in referring more specifically to FIG. 8.

It is supposed that the pager is in the "synchronized" state as described hereinabove, or alternatively in the "poorly synchronized" state, the address search not being blocked in these cases.

As already indicated hereinabove, for a given pager, the address code word which corresponds uniquely to it is always found in the same frame of the message signal. Consequently, it is useless to energize the receiver during the broadcast of other frames of a same broadcast data package.

If the pager under consideration has its address code word in the first frame (frame 0), receiver 3 is not cut off following recognition of the synchronization code word and the address code word recognition procedure may begin immediately. On the other hand, if the address code word is located in one of the frames 1 to 7, microprocessor 32 will await the number of clock pulses corresponding to the time of passage of the frames preceding that in which is located the address code word of the pager under consideration. To this end, microprocessor 32 includes a register (not shown) which contains this number and which is decremented by the clock signal applied to input 32.10. It is to be noted that the number in question is determined in a manner such that the receiver is either started several bits (eight for example) before the frame of interest begins, in order to permit it to be suitably stabilized, as already described hereinabove with reference to the process of recognition of the synchronization code word.

After run down of such receiver stabilization period (i.e. just at the beginning of the frame of interest), microprocessor 32 furnishes a 13 microseconds pulse at its output 32.8, maintains the output 32.4 at "0", furnishes a "0" at its output 32.9, a "1" at its output 32.5 and a "1" at its output 32.11 and applies a 13 microseconds pulse at its output 32.1. The assembly is then ready to effect the address recognition.

The address code word in accordance with the POCSAG format is made up of 32 bits, the first of which is always "0" in contrast to the first bit of a message code word which is always at "1". The address code word includes next a series of 18 bits which constitute the address information characteristic of the pager under consideration. The other bits of the address code word are not useful for addressing as such and constitute function and test bits.

From this, register 38 (FIG. 4) contains the 19 address code word bits identifying the pager in question. The internal bit counter of microprocessor 32 is loaded with this number (block 78 of FIG. 8) and the bit-by-bit verification of the address code word is begun in order to run through the program loop formed by blocks 79 to 82 of the program of microprocessor 32. During running of these operations, counter 30 watches over the number of inequalities determined during the comparison of successive bits. If the counter determines more than two inequalities, its output 30.5 goes to the "1" level following which microprocessor 32 causes its output 32.11 to pass to the "0" level, which cuts off receiver 3 during the remainder of the address code word (blocks 83 and 84). On the other hand, if the test effected in block 32 indicates that the internal bit counter of microprocessor 32 arrives at zero, this indicates that the pager under consideration has been addressed and that it must prepare itself to receive message information following the address code word in the incoming message signal (block 85).

In a general manner, it is seen that the invention brings about a real possibility of energy economy.

Effectively, during most of the time in which the pager is sensing the message signal, each recognition of the synchronization code word requires analysis only of six bits out of 32, while in the prior art, such analysis is systematically applied to the 32 bits of the synchronization code word. It is to be noted that in both cases the pager receiver must be started in advance of such analysis so that the improvement in energy consumed takes effect comparatively over the duration of 26 bits for each synchronization code word, which is considerable.

Furthermore, as far as concerns the address code word, a very substantial economy may be obtained since statistically it is known that a given pager is called only a small number of times each day, that is to say that its own address reaches it only rarely relative to all the address code words which are contained in the message signal broadcast by the central transmitter. Thanks to the invention, the receiver is cut off immediately as soon as it is determined during the comparison of the address code words that the pager is not being addressed at the moment under consideration.

Thus, in using nothing other than recognition of the synchronization code words according to the procedure described hereinabove relative to pagers of the prior art technique described in patent EP 0 118 153, the invention brings a relative energy economy of −23% (autonomy 130%) for a pre-turn on duration of 8 bits for receiver 3 and an economy of −20% (economy+26%) in the case in which such duration is that of 16 consecutive bits.

If only recognition of the address code words is used according to the procedure described hereinabove, the relative energy economy is of −38% (autonomy+60%) for a pre-turn on duration of 8 bits for receiver 3 and this is −27% (autonomy+36%) if such duration is of 16 bits.

In combining in a single pager both recognition procedures bearing then as much on the synchronization code words as on the address code words, the consumption will be respectively reduced by 61% with 8 bits and 47% with 16 bits, the increase in autonomy being then respectively of +255% and of +89%. Such figures concern the most favourable case in which the pager is synchronized and reception occurs under good conditions.

It is to be noted that the present invention has been described in respect of application to a pager using the POCSAG format. Nevertheless, it may equally be applied to pagers operating in other formats, provided that the principle of serial bit processing of the synchronization and address code words is respected.

What I claim is:

1. A pager for receiving radio-broadcast message signals made up from a synchronization code word repeated at regular intervals, address code words and message information code words, said message information comprising one or several messages, said pager comprising:

a receiver for receiving and demodulating said coded signals, a decoder for decoding said coded message signals in order to distinguish among said synchronization, address and message information code words and, when it is apparent that said pager is being addressed, extracting the message information intended therefor, a memory arrangement connected to said decoder for storing said message information, means connected to said memory arrangement for processing said message information so as to render it intelligible, energization means for powering said pager, switching means connected between said receiver and said energization means for selectively applying to said receiver a supply voltage furnished by said energization means, means for storing said synchronization code word having a plurality of bits each in either a logically high state or a logically low state, and control means for controlling said switching means so as to apply said supply voltage to said receiver in order to enable reception of the synchronization code word and to effect a comparison between said stored synchronization code word and the synchronization code word of said message signal each time the synchronization code word of said message is repeated to recognize said synchronization code word of said message, said control means being arranged to cut off said voltage following recognition of the synchronization code word, said control means comprising means for effecting said comparison bit-by-bit over only a portion of the synchronization code word bits exhibiting the greatest number of state changes between successive bits and for actuating said switching means to cut off said supply voltage to said receiver as soon as the comparison indicates recognition of the synchronization code word through identity of a limited number, less than all of the bits of the synchronization code word of said message.

2. A pager as set forth in claim 1 wherein, for the case in which said message signals assume the POCSAG format, said control means are arranged to effect said comparison on bits 19 to 24 of the synchronization code word.

3. A pager as set forth in claim 1 wherein said control means include counting means for counting the number of times that bit inequality is determined in the course of said bit-by-bit comparison, and wherein said control means are also arranged to pass, beginning with the next subsequent synchronization code word, from a bit-by-bit comparison of a limited number only of bits of said synchronization code word to a bit-by-bit comparison of an entire synchronization code word when comparison inequalities are counted in two consecutive synchronization code words.

4. A pager as set forth in claim 1 wherein said control means also include means for storing an address code word characteristic of said pager and means for effecting a bit-by-bit comparison of at least a portion of the stored address code word bits with the corresponding bits of the address code word contained in the incoming message signal and for actuating said switching means to maintain energization of said receiver only if said address comparison indicates a number of bit inequalities less than a predetermined number.

5. A pager as set forth in claim 4 wherein said control means include counting means for counting the number of times that an inequality of bits is determined in the course of said bit-by-bit comparison of the stored address code word with the address code word contained in said message signal and wherein said control means are also arranged to actuate said switching means as a function of the contents of said counting means.

6. A pager as set forth in claim 1 wherein said means for storing said synchronization code word include a ring register in which said word may circulate under the control of a clock signal having a frequency corresponding to the binary flow rate of said message signal.

7. A pager as set forth in claim 4 wherein said address code word storing means include a ring register in which said word may circulate under the control of a clock signal having a frequency corresponding to the binary flow rate of said message signal.

8. A pager as set forth in claim 6 wherein said address code word storing means include a ring register in which said address code word may circulate under the control of a clock signal having a frequency corresponding to the binary flow rate of said message signal, and wherein said registers for storing respectively the synchronization code word and address code word are commonly connected to bit-by-bit comparison means through switching means for connecting such registers selectively to said comparison means according to whether the message signal presents a synchronization code word or an address code word in the frame of such signal pertaining to said pager.

9. An assembly comprising a pager as claimed in claim 1 and a wrist watch for displaying horological functions.

* * * * *

UNITED STATES PATENT AND TRADEMARK OFFICE
CERTIFICATE OF CORRECTION

PATENT NO. : 5,463,383
DATED : October 31, 1995
INVENTOR(S) : Pache et al

It is certified that error appears in the above-indentified patent and that said Letters Patent is hereby corrected as shown below:

The title page, showing an illustrative figure, should be deleted and substitute therefor the attached title page.
   In the Drawings:
Delete Drawing Sheet 1 and substitute therefor the Drawing Sheet, consisting of FIG. 1, as shown on the attached page.

Signed and Sealed this

Twenty-first Day of May, 1996

*Attest:*

BRUCE LEHMAN

*Attesting Officer*    Commissioner of Patents and Trademarks

United States Patent [19]

Pache

[11] Patent Number: 5,463,383
[45] Date of Patent: Oct. 31, 1995

[54] RECEIVER FOR LOCAL CALLS WITH LOW ENERGY CONSUMPTION

[75] Inventor: Rémy Pache, St-Sulpice, Switzerland

[73] Assignee: Eta SA Fabriques d'Ebauches, Grenchen, Switzerland

[21] Appl. No.: 62,255

[22] Filed: May 17, 1993

[30] Foreign Application Priority Data

May 27, 1992 [CH] Switzerland .................. 01718/92

[51] Int. Cl.⁶ ........................................... G08B 5/22
[52] U.S. Cl. ........................ 340/825.44; 340/825.21; 370/105.4; 375/368
[58] Field of Search .................... 340/825.2, 825.21, 340/825.44; 455/343; 370/105.4, 106; 375/114, 116

[56] References Cited

U.S. PATENT DOCUMENTS

| | | | |
|---|---|---|---|
| 4,768,032 | 8/1988 | Sharpe et al. | 340/825.47 |
| 4,837,854 | 6/1989 | Oyagi et al. | 340/825.44 |
| 4,857,915 | 8/1989 | Andros et al. | 340/825.44 |
| 4,996,526 | 2/1991 | DeLuca | 340/825.44 |
| 5,001,471 | 3/1991 | Snowden et al. | 340/825.21 |
| 5,049,875 | 9/1991 | DeLuca et al. | 340/825.44 |
| 5,144,296 | 9/1992 | DeLuca et al. | 340/825.44 |
| 5,252,963 | 10/1993 | Snowden et al. | 340/825.44 |
| 5,325,088 | 6/1994 | Willard et al. | 340/825.21 |

FOREIGN PATENT DOCUMENTS

| | | |
|---|---|---|
| 0413369 | 2/1991 | European Pat. Off. |
| 9006566 | 6/1990 | WIPO |
| 9006634 | 6/1990 | WIPO |

Primary Examiner—Donald J. Yusko
Assistant Examiner—Gregg V. Miller
Attorney, Agent, or Firm—Griffin, Butler, Whisenhunt & Kurtossy

[57] ABSTRACT

A local call receiver or pager includes a circuit (3) for receiving and demodulating a call signal emitted by a central station and which contains synchronization code words, address code words and message code words. The circuit is connected to the pager energy source (16) through a switching circuit (3b) for cutting off the energy supply when it is not necessary to receive the call signal. The pager also includes a decoder (4) intended to control the switching circuit as a function of the analysis of the call signal synchronization code words. The analysis is effected bit-by-bit and the receiver circuit is disconnected as soon as the synchronization code word is recognized, in most cases following analysis of only a few bits of the code word. Application is in respect of pagers in which a satisfactory compromise must be obtained between dimensions and autonomy, as for instance in pagers combined with a timepiece to be worn on the wrist.

9 Claims, 9 Drawing Sheets

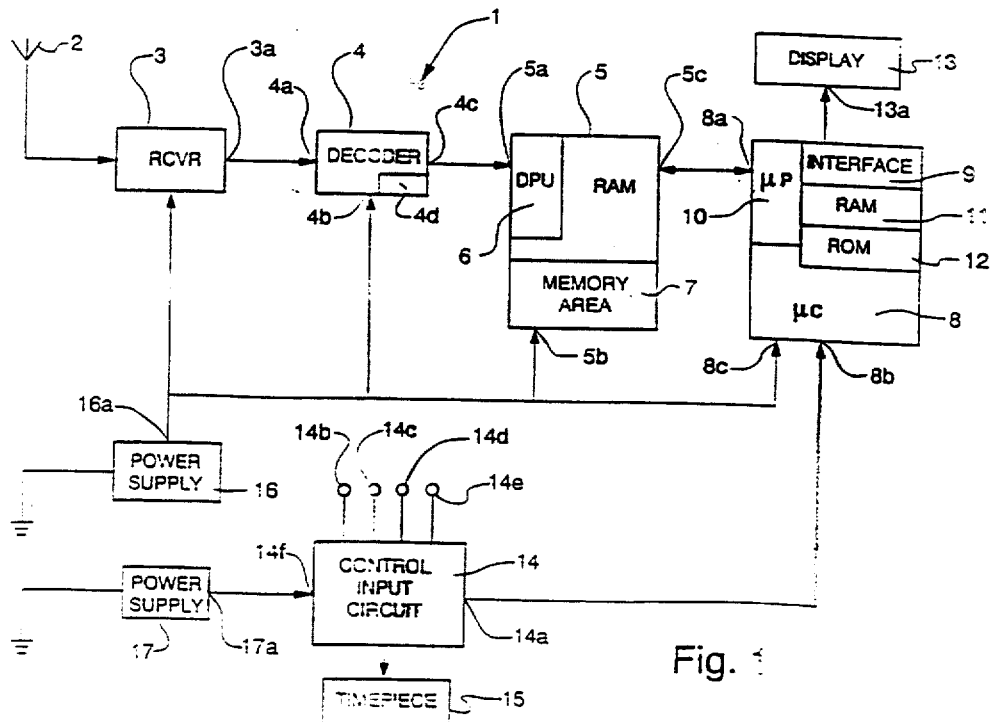

Fig. 1

UNITED STATES PATENT AND TRADEMARK OFFICE
CERTIFICATE OF CORRECTION

PATENT NO. : 5,463,383    Page 3 of 3
DATED : October 31, 1995
INVENTOR(S) : Rémy Pache It is certified that error appears in the above-indentified patent and that said Letters Patent is hereby corrected as shown below:

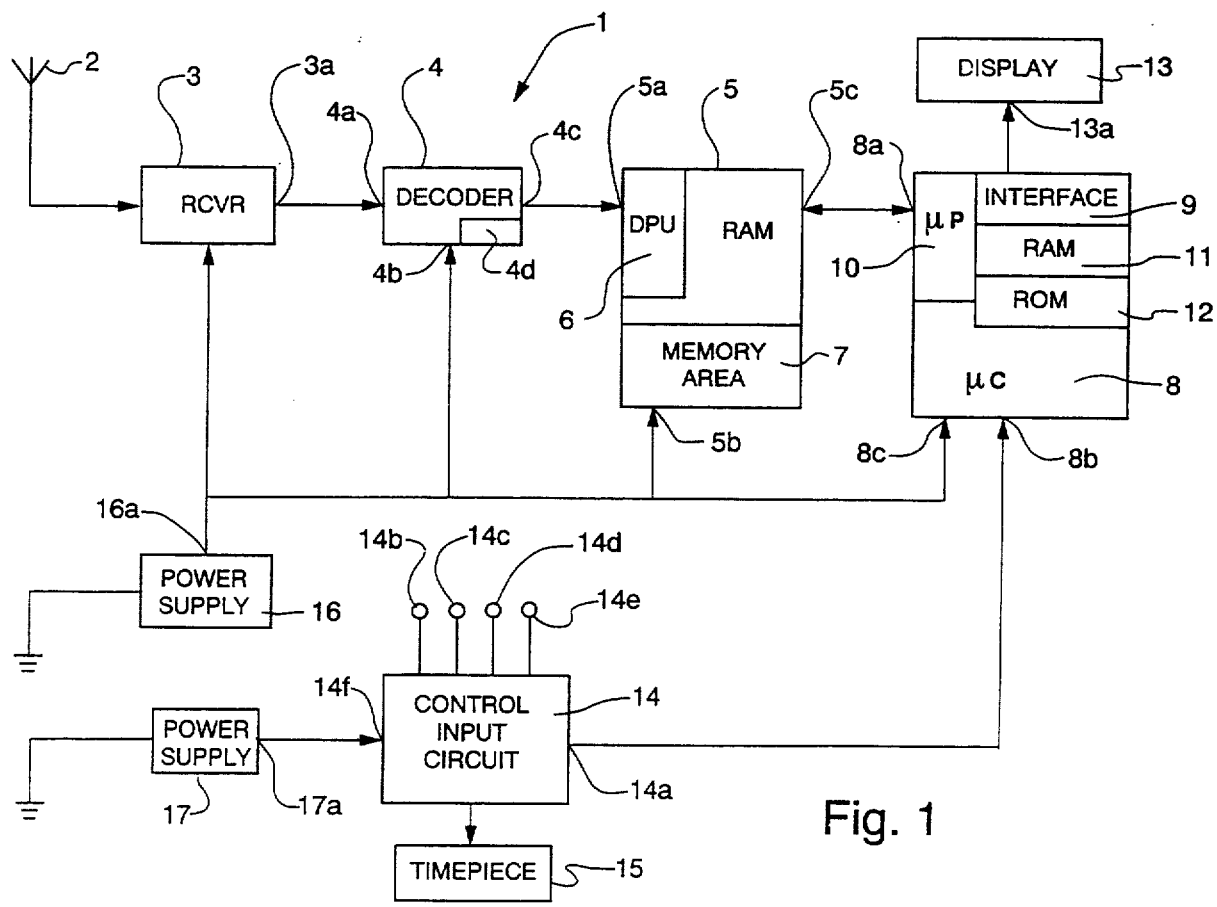

Fig. 1